United States Patent [19]

Bellino

[11] B 4,055,060
[45] Oct. 25, 1977

[54] BICYCLE LOCK
[76] Inventor: Jim Bellino, 19209 Baseline, Glendora, Calif. 91776
[21] Appl. No.: 377,498
[22] Filed: July 9, 1973
[44] Published under the second Trial Voluntary Protest Program on May 26, 1976 as document No. B 377,498.
[51] Int. Cl. .............................................. B62h 5/06
[52] U.S. Cl. ...................................... 70/234; 70/185; 70/238
[58] Field of Search ...................... 70/49, 53, 185, 233, 70/234, 236, 238, 371

[56] References Cited
U.S. PATENT DOCUMENTS

| 1,475,256 | 11/1923 | Belair | 70/49 X |
| 1,772,747 | 8/1930 | Croning | 70/185 X |
| 1,797,075 | 3/1931 | Croning | 70/371 UX |
| 1,806,253 | 5/1931 | Fairchild | 70/185 X |
| 3,774,421 | 11/1973 | Stephens | 70/236 X |

FOREIGN PATENT DOCUMENTS

| 905,252 | 4/1945 | France | 70/233 |
| 836,304 | 4/1952 | Germany | 70/49 |

Primary Examiner—Albert G. Craig, Jr.
Attorney, Agent, or Firm—Dominick Nardelli

[57] ABSTRACT

A bicycle lock is disclosed wherein the steering is locked and a securing cable is provided to fasten the bike to a fixed object. The lock is provided with a removable tumbler, having an axially aligned pin, that normally passes through an eyelet on one end of the cable and through suitable bores, in the steering post and the rotating steering sleeve, respectively.

5 Claims, 4 Drawing Figures

BICYCLE LOCK

FIELD OF THE INVENTION

This invention relates to a bicycle lock, and more particularly to a lock that provides a steering lock and a means for anchoring the bicycle.

BACKGROUND OF THE INVENTION

In the past, bicycles were locked by locks that either locked the steering or anchored the bike to a fixture. If one wanted to use both methods of locking, inherently two locks were required, one for steering and one for anchoring and this inherently required two keys or, if only one key was required, the owner had to go to special means to provide the same combination on both lock tumblers.

OBJECTS OF THE INVENTION

An object of this invention is to provide a lock for a bicycle that provides a means for locking the steering and a means for anchoring the bike.

Another object is to provide a simple, economical lock that can be retrofitted on most bicycles.

Another object is to provide a simple bicycle lock with a removable tumbler.

These and other objects and features of advantage will become more apparent after studying the following detailed description of the preferred embodiment of the invention, together with the appended drawings.

DETAILED DESCRIPTION OF THE DRAWINGS

Figure 1:
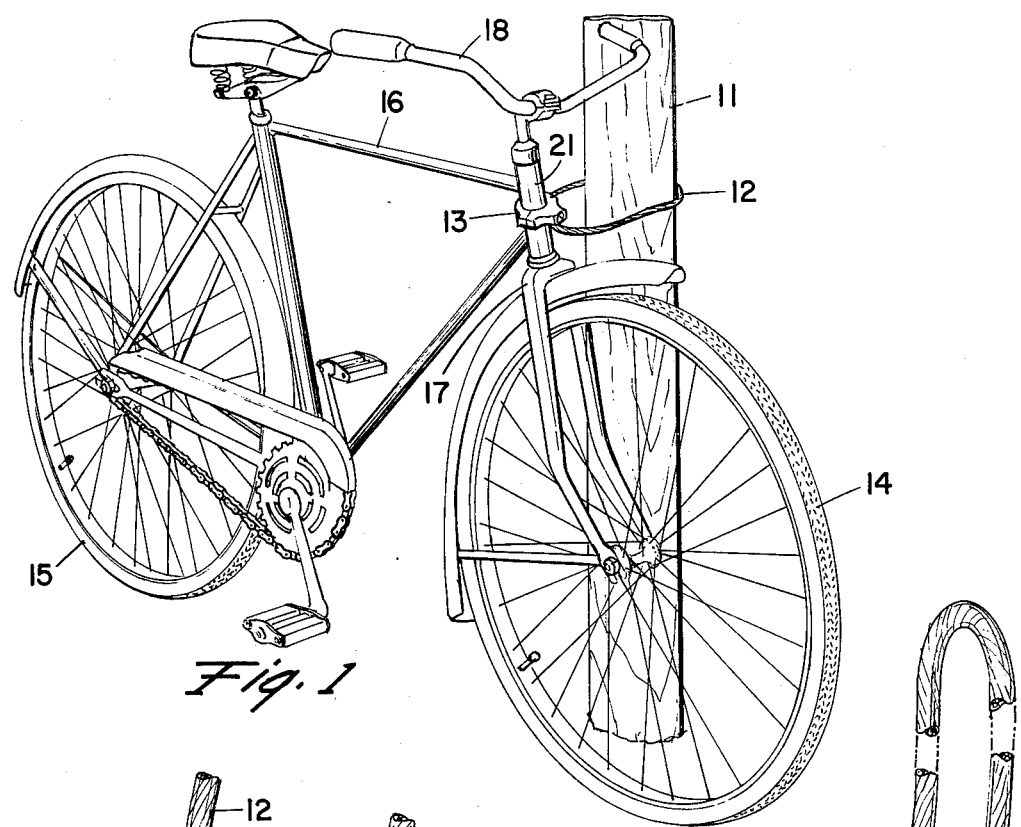
FIG. 1 is a pictorial representation of a typical bicycle employing my novel lock.

Referring to FIG. 1 a typical bicycle is shown anchored to a post 11 by aid of a cable 12 having its ends fixed to my novel lock 13. The bicycle, being a standard model, has two wheels 14 and 15, a frame 16, a front wheel fork 17, and handlebars 18. On top of the fork 17 is integrally formed a sleeve 19 (FIG. 2) that is journaled to rotate in a standard manner within a tube 21 on the frame 16. My novel lock 13 is fixed around the tube 21.

Figure 2:
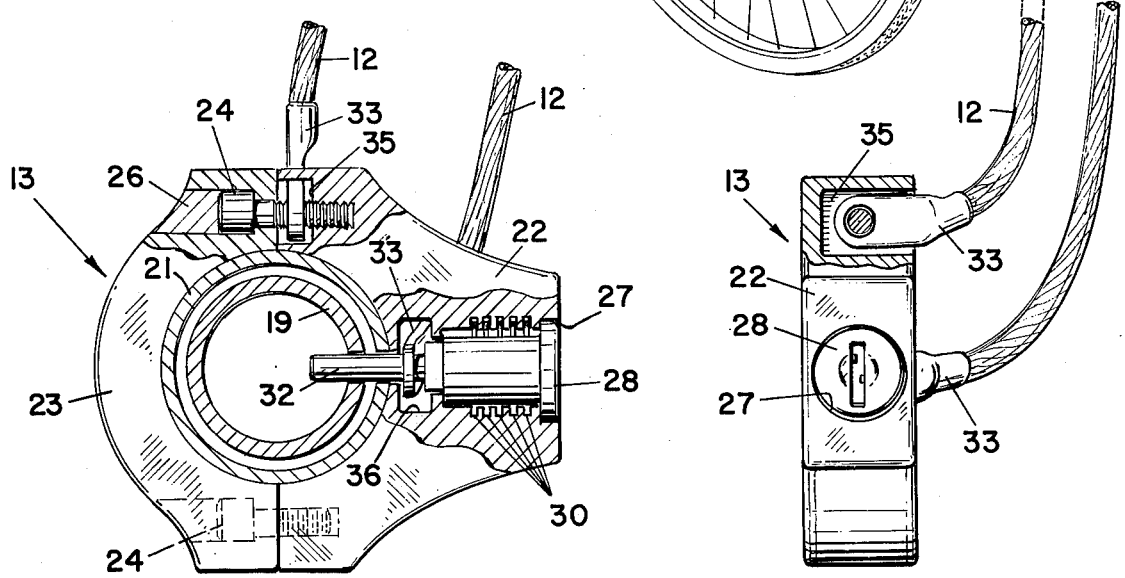
FIG. 2 is a plan view in partial section of the lock shown in FIG. 1.
Figure 3:
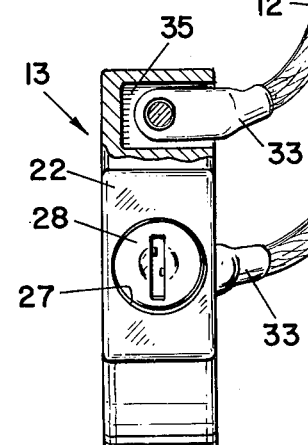
FIG. 3 is a side view in partial section of the lock shown in FIG. 2.
Figure 4:
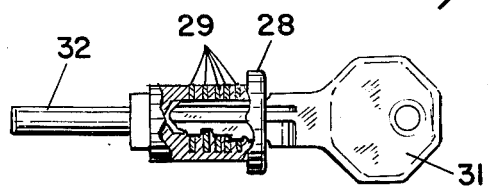
FIG. 4 is the tumbler removed from the lock with the key inserted therein.

Referring to FIGS. 2, 3, and 4, my novel lock 13 will now be described. The lock 13 has two semi-cylindrical sections, a key section 22 and a base section 23, which when clamped together as shown in FIG. 2 form a round opening through which the tube 21 passes. The two sections 22 and 23 allow the lock to be retrofitted on existing bicycles because they bolt together by suitable screws 24 with their exposed ends being plugged by suitable plug material 26 being, for example press fitted within the opening to make unauthorized removal thereof extremely difficult. The key section 22 has an irregularly shaped bore 27 into which is disposed a standard lock tumbler 28, more clearly shown in FIG. 4, which tumbler has a plurality of standard keepers 29 which, when a key 31 is inserted therein, causes all keepers 29 to become flush with the outside cylindrical surface of the sleeve of the tumbler 28, as shown in FIG. 4. Naturally, when the key 31 is removed, the keepers 29, being spring biased, are urged radially outward as shown in FIG. 2 therein, they respectively engage a plurality of detents in the form of circumferential internal grooves 30. Circumferential grooves 30 are preferred over, for example, recesses, for reasons that will be explained hereinafter.

On the internal ends of the standard tumbler 28 I have formed, integral therewith, a dowel 32 that is preferably disposed axially. The dowel 32 is so made to extend inwardly and through suitable holes in both the tube 21 and sleeve 19, thereby preventing rotation thereof and steering ability. To restore the steering ability, one need only insert the key 31 which frees the keepers 29 from their respective grooves 30, whereby the tumbler 28 may be axially moved out of the bore 27. One can see that the circumferential grooves 30 allow reinsertion of the tumbler 28 and immediate positive locking without rotating the tumblers, which rotation would be required if recesses were used and not circumferential grooves. Since the tumblers 28 and dowel 32 are removable, this feature is utilized to provide an anchoring means in a form of a cable without the need of an additional key or tumbler. The cable 12 is fitted on each end with a standard eye socket 33. The key section is also provided with two cutouts 35 and 36 that open from one side thereof as shown in FIG. 3 for cutout 35. One observes that one of the screws 24 passes through cutout 35 and through one of the eye sockets 33. The dowel 32 passes through cutout 36 and also through the other eye socket 33.

Thus a lock has been described wherein the steering can be locked as well as having the bicycle anchored to a fixed object. Although the preferred embodiment of my invention has been disclosed, the invention is not to be considered limited thereto, but includes all embodiments falling within the scope of the claims.

I claim:

1. A lock for preventing relative rotation between an external tube and a sleeve journaled to rotate therein, said lock comprising:

a member disposed around said tube and having a radially disposed bore;

said tube and said sleeve each having radially disposed holes which become aligned in a given relative position between said tube and said sleeve;

said hole on said tube being aligned with the said bore on said member;

a lock tumbler having means at one end to receive a key; and a dowel extending from the other end;

said lock tumbler being the type that has a plurality of keepers spring biased radially outward;

said bore being shaped to receive said tumbler and including detents to respectively receive said keepers;

a cable;

means for fixedly anchoring one end of said cable to said member;

said member having a cutout into one side thereof, communicating with said bore; and said cable having an eye socket at said other end and adapted to be engaged by said dowel when said eye socket is within said cutout.

2. The lock of claim 1 wherein said member comprises:

a key section and a base section;

bolt means for securing said both sections around said tube; and means for locking said bolt means.

3. The lock of claim 2 wherein said bolt means includes at least one screw passing through one of said sections to engage threads of the other of said sections;

said means for fixedly anchoring said one end of said cable includes another eye socket fixed to said one end of said cable; and said member having another cutout communicating with said screw and said screw disposed through said respective eye socket.

4. The lock of claim 1 wherein said detents are internal circumferential grooves formed within said bore.

5. The lock of claim 4 wherein said member comprises a key section and a base section, bolt means for securing said both sections around said tube; and means for locking said bolt means.

* * * * *